United States Patent
Bott

[15] 3,677,563
[45] July 18, 1972

[54] FIFTH WHEEL COUPLER APPARATUS

[72] Inventor: Ned Bott, 2169 Westview Drive, Ashland, Ohio 44085

[22] Filed: July 1, 1969

[21] Appl. No.: 838,154

[52] U.S. Cl. .................................280/425 R, 254/88
[51] Int. Cl. ...........................................B62d 53/08
[58] Field of Search.................280/425 R, 438; 254/88

[56] References Cited

UNITED STATES PATENTS

| | | |
|---|---|---|
| 2,341,815 | 2/1944 | Russell et al.................254/88 |
| 1,990,700 | 2/1935 | Kinne.........................280/425 |
| 2,515,575 | 7/1950 | Van Langen..................280/425 |
| 3,146,040 | 8/1964 | Gist........................280/433 X |
| 3,241,860 | 3/1966 | Janeway.....................280/438 |
| 3,360,280 | 12/1967 | Betchart...................280/425 X |

FOREIGN PATENTS OR APPLICATIONS 1,235,509   5/1960   France...............................280/425

Primary Examiner—Benjamin Hersh
Assistant Examiner—Leslie J. Paperner
Attorney—Teare, Teare & Sammon

[57] ABSTRACT

A fifth wheel coupler apparatus adapted for use with a tractor vehicle for hauling a semi-trailer vehicle including a pair of trackways carried by the tractor vehicle and a carriage assembly supported for riding movement on the trackways. A fifth wheel is mounted on the carriage assembly adapted for coupling the trailer vehicle to the front end of the semi-trailer vehicle. The trackways are inclined in a generally upwardly and rearwardly direction with respect to the horizontal or normal direction of movement of the tractor vehicle enabling the carriage assembly, and thus, the front end of the trailer vehicle to be elevated upon relative movement of the tractor vehicle with respect to the semi-trailer vehicle. A locking unit is provided to hold the carriage assembly in the raised position while the semi-trailer vehicle is transported from one location to another.

5 Claims, 7 Drawing Figures

Patented July 18, 1972

INVENTOR
NED BOTT
BY
Teare, Teare & Sammon

ATTORNEYS

INVENTOR
NED BOTT

BY Teare, Teare & Sammon

ATTORNEYS

FIFTH WHEEL COUPLER APPARATUS

BACKGROUND OF THE INVENTION

This invention relates to an apparatus and method for coupling a tractor vehicle to a semi-trailer vehicle, and more particularly to an apparatus and method for use in "yard jockey" service.

Heretofore, many different types of apparatus have been provided for quick coupling of the fifth wheel of a tractor vehicle to a semi-trailer vehicle for "yard jockey" service. In such applications, it is necessary to raise the fifth wheel and the associated front end of the semi-trailer vehicle so that the semi-trailer vehicle can be transported from one place to another. It is not only desirable that the connection to the trailer vehicle be accomplished quickly, but also that the raising and lowering of the front end of the trailer vehicle also be accomplished in a facile and efficient manner.

The devices presently available for such service employ relatively complex machinery having either mechanical, hydraulic and/or pneumatic actuating devices which are adapted to act on the machinery to thus raise and/or lower the same. These devices have not been found to be completely satisfactory in that they are costly to manufacture and maintain. In addition, the reliability of these devices is somewhat less than that desired in that they are totally reliant for actuation upon these aforementioned mechanical, hydraulic and/or pneumatic devices.

SUMMARY OF THE INVENTION

The present invention contemplates providing an economical, reliable and rugged fifth wheel coupler apparatus which may be operated in an extremely facile and efficient manner.

The fifth wheel coupler apparatus comprises a track means which is carried by the tractor vehicle and a carriage means which is operably supported by the track means being adapted for relative movement with respect thereto. The fifth wheel is mounted on the carriage means for coupling the tractor vehicle to a trailer vehicle. The carriage means is disposed for riding engagement on the track means to respectively lower and raise the fifth wheel and the trailer vehicle upon movement of the tractor vehicle toward and away from the trailer vehicle. To achieve the raising and lowering of the fifth wheel, the track means is disposed in generally angular relation with respect to the normal horizontal position of the tractor vehicle. A guide means is associated with the carriage means which is adapted for camming coacting engagement with the track means upon movement of the carriage means along the track means. In the preferred form, the track means comprises at least one pair of oppositely disposed trackways which extend generally upwardly and rearwardly with respect to the trailer vehicle. The trackways are provided in the form of elongated slots being defined in lengthwise dimension by upper and lower bearing edge surfaces which are adapted for camming engagement with the carriage means. The guide means preferably comprise roller members which are journaled for rotation in the carriage means, and which are adapted for rolling engagement along the respective bearing edge surfaces of the respective slots.

As can be seen, the fifth wheel coupler apparatus of the present invention provides a simple yet rugged construction which is extremely easy to operate without the employment of highly complex power equipment for actuation of the same. In addition, the elimination of this power equipment substantially increases the reliability of the apparatus and substantially reduces the maintenance and repair costs.

DESCRIPTION OF THE PREFERRED EMBODIMENTS

Figure 1:
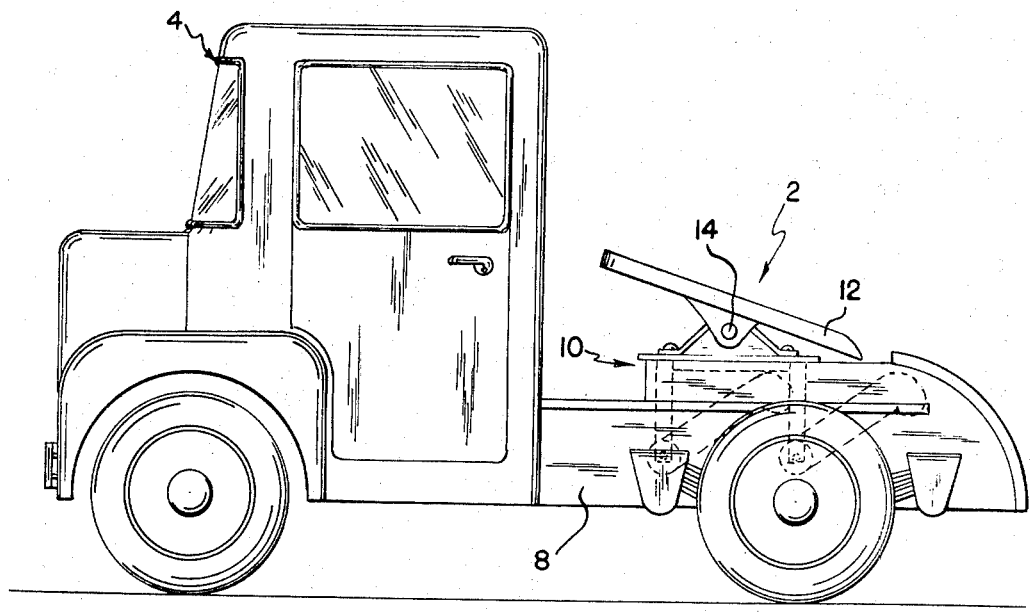
FIG. 1 is a side elevation view of the fifth wheel coupler apparatus of the present invention, and is shown mounted on a tractor vehicle in the lowered position.
Figure 2:
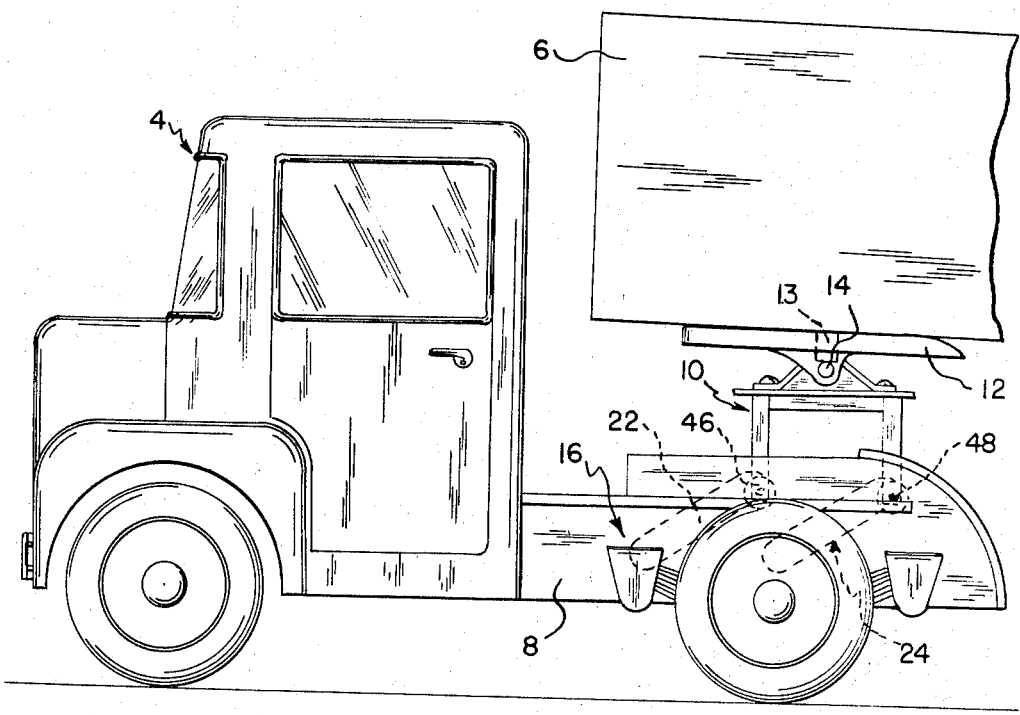
FIG. 2 is a side elevation view of the tractor vehicle shown in FIG. 1 illustrating the fifth wheel coupler apparatus in the raised position.

The coupler apparatus of the present invention is illustrated, generally at 2, in FIG. 1 and is adapted for use with a tractor vehicle 4 for hauling a semi-trailer vehicle, such as at 6 in FIG. 2. As shown, the coupler apparatus is mounted adjacent the rear end of the chassis 8 of the tractor vehicle 4, and comprises a carriage assembly 10 on which a fifth wheel 12 is pivotally mounted, as at 14, for coupling the tractor vehicle 4 to the trailer vehicle 6. The carriage assembly 10 is supported for riding engagement on track means, as at 16, which are disposed in a generally inclined relation with respect to the normal horizontal direction of movement of the tractor vehicle to provide a camming surface for the carriage assembly 10. As shown, the track means 16 is inclined in a generally upwardly and rearwardly direction whereby the carriage assembly 10 will be elevated as the carriage assembly 10 moves rearwardly along the track means 16. By this arrangement, the associated coupled end of the semitrailer vehicle may be selectively raised or lowered upon relative movement of the tractor vehicle toward or away, respectively, from the trailer vehicle when in the coupled condition.

Figure 3:
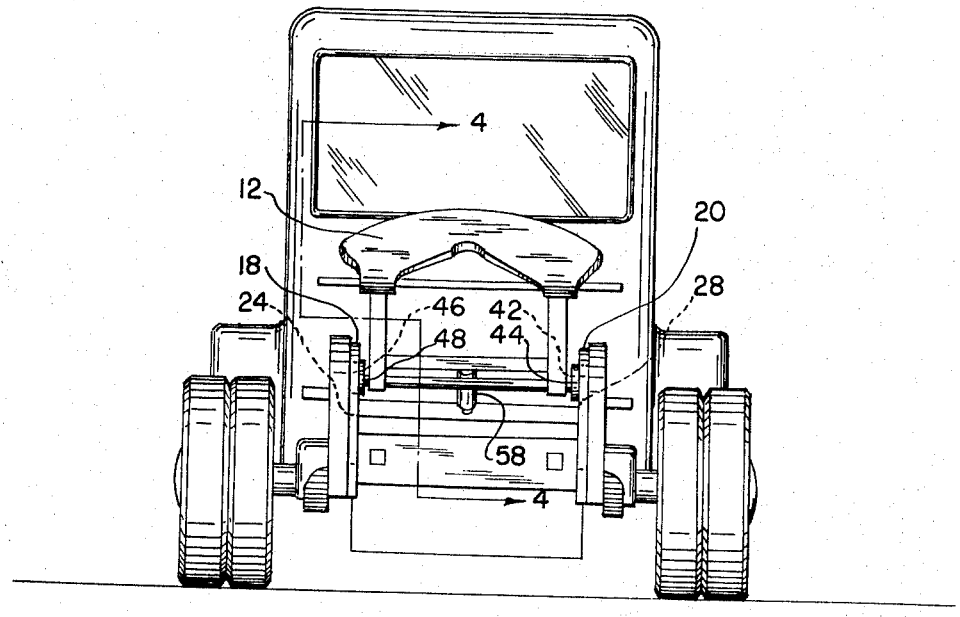
FIG. 3 is a rear elevation view of the fifth wheel coupler apparatus as shown in FIG. 2 when viewed from the right hand side.
Figures 4, 5:
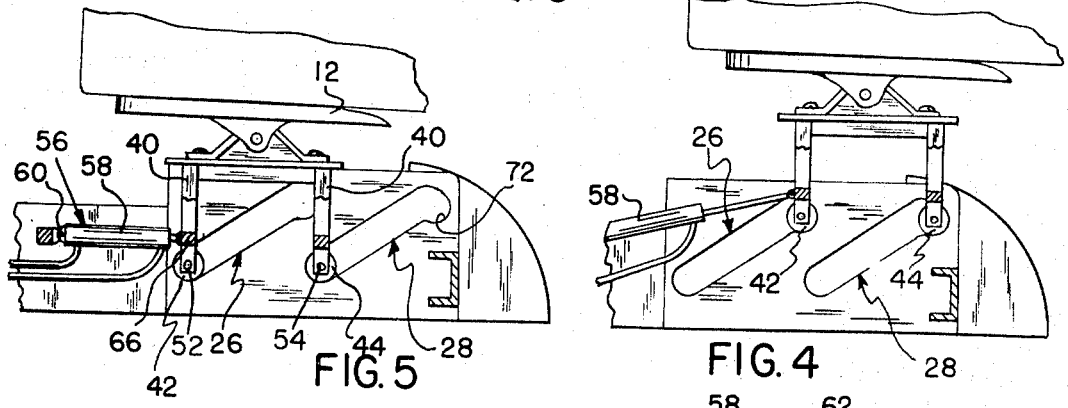
FIG. 4 is a fragmentized, partially in section, side elevation view taken along the line 4—4 of FIG. 3.
FIG. 5 is a fragmentized, partly in section, side elevation view of the fifth wheel coupler apparatus shown in FIG. 4 with the carriage assembly disposed in the lower most position.

As shown in FIG. 3, the track means 16 preferably includes a pair of spaced, generally vertically oriented support plates 18 and 20 which extend lengthwise along the chassis 8. Referring also to FIGS. 2 and 5, each of the plates 18 and 20 may be provided with at least one, but preferably a pair of elongated trackways in the form of slots, such as at 22 and 24 (FIG. 2) and 26 and 28 (FIG. 6), respectively, which are adapted to support the carriage means 10 for riding engagement therein. Preferably, each of the respective slots extends generally angularly, upwardly and rearwardly with respect to the chassis 8.

Figure 6:
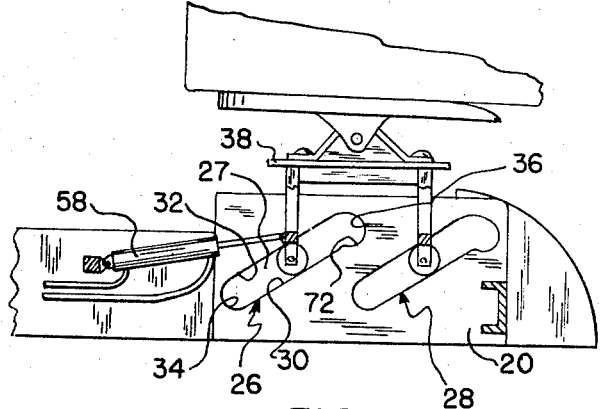
FIG. 6 is a fragmentized, partly in section, side elevation view of the fifth wheel coupler apparatus illustrated in FIG. 4 with the carriage assembly shown in the intermediate position.

Referring now to FIG. 6, each of the slots is preferably identical in size and configuration, and therefore, only one of the slots will be described in detail, such as 26, with like portions of the other slots being designated with like numerals. As shown, the slot 26 is defined along its lengthwise dimension by opposed, generally parallel inclined lower 30 and upper 32 bearing edges. The lower and upper ends of the slots are defined by abutment surfaces 34 and 36, respectively, being adapted to limit the downward and upward movement of the carriage assembly.

Preferably, the slots, such as 26 and 28, which are provided in a respective one of the plates, such as 20, are disposed in generally co-extensive relation with one another being positioned one behind the other lengthwise of the plate 20. In addition, each pair of slots, such as 26 and 28, are disposed in generally aligned parallel relation with the opposed pair of slots, such as 22 and 24 in the plate 18, respectively. By this arrangement, the corresponding lower 30 and upper 32 bearing edges of the opposed front slots 22, 26 and rear slots 24, 28 will be disposed in generally parallel relation to provide trackways on opposed sides of the carriage assembly.

Referring again to FIGS. 1 and 2, the carriage assembly 10 comprises a support member, such as a platform 38, which is adapted to pivotally support the fifth wheel, which spans the space between the respective opposed pairs of slots 22, 24 and 26, 28. The platform 38 may be provided with downwardly depending legs 40 which may be disposed inwardly of and between the respective plates 18 and 20. Referring to FIGS. 3 and 5, camming members 42, 44, 46 and 48 may be operably connected adjacent the lower ends of the leg members 40 being adapted for camming coacting engagement with the respective bearing surfaces 30 and 32. In the preferred form, the camming members 42, 44, 46 and 48 comprise rollers or wheels which have a diameter slightly less than the minimum transverse width of the respective slots 22, 24, 26 and 28 being adapted to be mounted therein for rolling engagement along the bearing surfaces 30 and 32.

As shown, an associated pair of wheels, such as 42 and 46, are disposed within the forward pair of opposed slots 22 and 26, respectively, being mounted on a common shaft 52 which may be journaled for rotation adjacent the forward end of the platform while the other or rearward pair of wheels 44 and 48, adapted to be disposed within the slots 28 and 24, respectively, may be mounted on another shaft 54 adjacent the rear end of the platform.

To lock the carriage at the completely raised position or any intermediate raised position, a locking unit 56 may be provided. Preferably, the locking unit 56 comprises a fluid-actuated motor having a fluid cylinder 58 which may be pivotally connected at one end to the chassis, as at 60. The fluid motor includes a piston member 62 (FIG. 7) which is adapted for reciprocating movement within the fluid cylinder 58. An elongated extensible plunger member 64 extends rearwardly being pivotally connected to the carriage assembly, as at 66.

Figure 7:
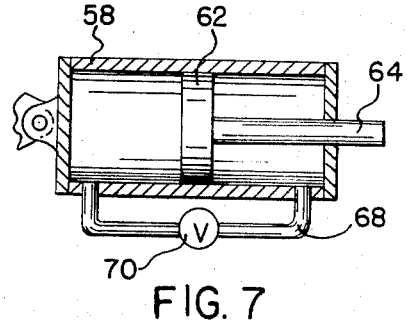
FIG. 7 is a diagrammatic illustration of a fluid motor which may be employed in the present invention.

Preferably, the locking unit 56 is centrally aligned with respect to the carriage assembly 10 with the plunger member 64 being adapted for reciprocating movement in a direction substantially generally parallel with the direction of movement of the carriage assembly 10. In the preferred form, as shown in FIG. 7, the fluid cylinder may include a supply line 68 which innerconnects the opposed front and rear ends of the cylinder 58 to enable fluid to pass from one side of the piston member 62 to the opposite side. A control valve 70 may be disposed in the supply line to control, such as cut-off, the flow of fluid between the opposed sides enabling the piston member, and thus, the carriage assembly, to be selectively locked in any intermediate position, as shown in FIG. 6.

To facilitate and increase the locking action at the completely raised position, each of the slots may be provided with a generally horizontal or level edge portion 72 adjacent the upper end (FIGS. 4, 5 and 6). By this arrangement, the combined force of the trailer vehicle and carriage assembly are directed generally vertically downwardly into bearing engagement with the level edge portion 72 eliminating any angular component of force so that the gravational component of force on the power unit is virtually eliminated in the normal horizontal operating position of the tractor vehicle.

OPERATION

In a typical operation of the coupler apparatus 2 of the present invention, the rear end of the tractor vehicle 4 is backed up to and aligned with the front end of the trailer vehicle 6 which is conventionally supported adjacent the front end by means of jacks (not shown) when in a stored position. Generally, the brakes of the trailer vehicle 6 are in the applied condition when the trailer vehicle is being stored, and thus, will normally be in the applied condition at this point of the operation. If the brakes have not been applied, then they should be applied at this time. The tractor vehicle is then backed up into engagement with the trailer vehicle 6 so that the fifth wheel 12 can be connected to the connector pin 13. As can be seen in FIG. 1, at this time, the carriage assembly 10 is in the lower forwardmost position with the abutment surfaces 34 of the respective slots providing support to prevent any forward movement thereof. In addition, the control valve 70 of the locking unit 58 may be placed in the locked position to further prevent movement of the carriage assembly in either the forward or rearward direction.

At this time, the control valve 70 of the locking unit 58 may be turned to the unlocked position to enable the fluid contained therein to flow freely between the opposed sides of the piston member 62.

The tractor vehicle 4 may then be moved forwardly in a direction away from the front end of the trailer vehicle 6 causing the wheels 42, 44, 46 and 48 to move rearwardly and upwardly within the respective slots 26, 28, 22 and 24 and away from the abutment surfaces 34. As the tractor vehicle 4 begins to move forwardly with respect to the trailer vehicle 6, a force will be applied at the pivotal connection between the fifth wheel 12 and the carriage assembly 10, such as at 14. When the resultant of the combined vertical and horizontal forces acting on the pivotal connection 14 is directed above and rearwardly of the central axis of the rearward shaft 54, the platform 38 will tend to rotate, such as clockwise as seen in FIGS. 4, 5 and 6, about the central axis of the rearward shaft 54. Such rotation will cause the front wheels 42 and 46 to be lifted off of the lower bearing edge surfaces 30 of the respective forward slots 26 and 22, and be moved into engagement with the upper bearing edge surfaces 32 thereof. Therefore, whether the front wheels 42 and 46 ride on the upper 32 or lower 30 bearing edge surfaces will depend on the direction of the aforementioned resultant force and its magnitude. In addition, as the carriage assembly 10 moves rearwardly, the plunger member 64 will be extended rearwardly therewith causing fluid in the cylinder 58 to flow from the rearward side of the piston member 62 through the valve 70 to the opposite or forward side of the cylinder 68. If desired, the control valve 70 of the locking unit 58 may be shut-off when the carriage is at any position along the respective slots thereby locking the carriage assembly 10 at any intermediate position between the upper 36 and lower 34 abutment surfaces.

As the carriage assembly 10 reaches the completely upward position, the forward wheels 42 and 46 will roll smoothly into engagement with the upper abutment surfaces 36 while the rearward wheels 44 and 48 will roll off of the inclined lower bearing edge surfaces 30 onto the normally horizontal level edge portion 72. At this time, the control valve 70 of the locking unit 58 may be turned to the shut-off position to lock the plunger member 64 in the extended position, thereby locking the carriage assembly in the completely upward position.

After the carriage assembly 10 is locked in the completely upward position, the brakes on the trailer vehicle can be released to enable the tractor vehicle 4 to transport the trailer vehicle 6 to any desired location. When the trailer vehicle 6 has been positioned in the proper location, the brakes may again be applied.

The control valve 70 of the locking unit 58 may then be placed in the unlocked position to allow fluid to flow from the front end of the cylinder 58 to the opposite or rearward end of the cylinder enabling the piston 62 to move forwardly within the cylinder 58, and thus, the plunger member 64 to be retracted.

The tractor vehicle 4 may then be backed-up in a direction toward the trailer vehicle 6 causing the carriage assembly to move forwardly with respect to the tractor vehicle 4. Again, as during the raising operation, the carriage assembly 10 will tend to rotate about the central axis of the rearward shaft 54 depending upon the direction of the resultant force at the pivotal connection 14. When the carriage assembly has moved to the lowermost end of the respective slots, and the respective wheels are disposed in abutting engagement with the abutment surfaces 34, the valve on the valve 70 on the locking unit 58 may be placed in the locked position to again prevent any movement of the carriage assembly 10.

The fifth wheel 12 may then be disconnected from the connecting pin 13 in the conventional manner, and the tractor vehicle 4 may be driven forwardly in a direction away from the front end of the trailer vehicle 6 to disengage the tractor vehicle from the trailer vehicle thereby leaving the trailer vehicle supported by the jacks (not shown). The tractor vehicle may then be moved to any other desired location for expeditiously moving another trailer vehicle in the same aforementioned manner.

I claim:

1. A tractor vehicle for hauling a trailer vehicle of the type including a braking system comprising, a chassis, said chassis including a front end and a rear end and being adapted for selective movement forwardly and rearwardly along the ground, a fifth wheel assembly mounted on said chassis including a fifth wheel member for coupling said tractor vehicle to one end of said trailer vehicle for moving said trailer vehicle, as a unit, with said tractor vehicle, track means supported by said chassis said fifth wheel assembly including a carriage assembly mounted for movement on said track means relative to said chassis, said track means extending generally in a direction between the front end and the rear end of said chassis to enable movement of said carriage assembly in a direction between said front end and said rear end of said chassis, said fifth wheel member being mounted on said carriage assembly to enable movement of said tractor vehicle relative to said trailer vehicle, said track means including a bearing surface for supporting said carriage assembly said bearing surface being inclined generally upwardly in the direction from the front end to the rear end of said chassis and including a lower end and an upper end for moving said carriage assembly from a lowered position to a raised position when said fifth wheel member is coupled to said trailer vehicle and said tractor vehicle is moved forwardly with respect to said trailer vehicle while said braking system is actuated, said bearing surface including a generally level non-inclined portion adjacent said upper end for supporting said carriage assembly thereon in the raised position, and selectively actuatable locking means mounted on said tractor vehicle and operably connected to said carriage assembly for locking said carriage assembly in said raised position on said generally level non-inclined portions to maintain said one end of said trailer vehicle in a raised position for moving said trailer vehicle, as a unit, along the ground.

2. A tractor vehicle in accordance with with claim 1, wherein said track means comprises at least one pair of spaced elongated trackways, and the lengthwise dimensions of said trackways extends in a direction from the front end to the rear end of said chassis.

3. A tractor vehicle in accordance with claim 1 wherein said locking means comprises an extensible, fluid-actuated cylinder connected between said chassis and said carriage assembly.

4. A method for coupling a tractor vehicle having a chassis to one end of a trailer vehicle for moving the trailer vehicle, as a unit, with the tractor vehicle along the ground and wherein the chassis includes a front end and a rear end having a fifth wheel member mounted adjacent the rear end for coupling to the trailer vehicle, and wherein the tractor vehicle is operative to selectively move the chassis along the ground in the direction of the front end or the rear end, and wherein a carriage assembly is mounted on the chassis being movable back and forth in a direction between the front end and the rear end, the fifth wheel is mounted on the carriage assembly for movement, as a unit, therewith, and wherein a track assembly is mounted on the chassis including a bearing surface for supporting the carriage assembly for movement relative to the chassis, and wherein the bearing surface is inclined upwardly in a direction from the front end to the rear end of the chassis including upper and lower ends with the upper end having a generally level non-inclined portion, a selectively actuatable locking means is connected between said carriage assembly and said chassis, the steps comprising, applying the brakes on said trailer vehicle, moving said tractor vehicle in a direction toward its rear end into aligned relation with the one end of said trailer vehicle for coupling to said tractor vehicle, coupling said fifth wheel member with said one end of said trailer vehicle, moving said carriage assembly upwardly and rearwardly along said trackways to raise said fifth wheel and the coupled end of said trailer vehicle by moving said tractor vehicle in a direction toward its forward end and away from said trailer vehicle while said braking system of said trailer vehicle is actuated, moving said carriage assembly onto said non-inclined portions, locking said carriage assembly in the raised position with said carriage assembly on said noninclined portions, deactuating the braking said trailer vehicle, as a unit, with the coupled end of said trailer vehicle in the raised position to a predetermined location.

5. A method in accordance with claim 4, including the steps of terminating the movement of said tractor vehicle and said trailer vehicle, unlocking said carriage assembly, actuating said braking system of said trailer vehicle to prevent movement of said trailer vehicle relative to the ground, moving said carriage assembly downwardly along said track assembly to lower said fifth wheel and the coupled end of said trailer vehicle by moving said tractor vehicle in a direction toward its rear end and toward said trailer vehicle while said braking system is actuated, uncoupling said trailer vehicle from said tractor vehicle when said fifth wheel and said carriage assembly have been moved to the fully lowered position, and moving said tractor vehicle in a direction toward its front end and away from said trailer vehicle to another predetermined location for coupling to another trailer vehicle.

* * * * *